Aug. 4, 1925.
J. D. PIRTLE
1,548,206
PRESSURE LIMITING GAUGE
Filed Feb. 23, 1924
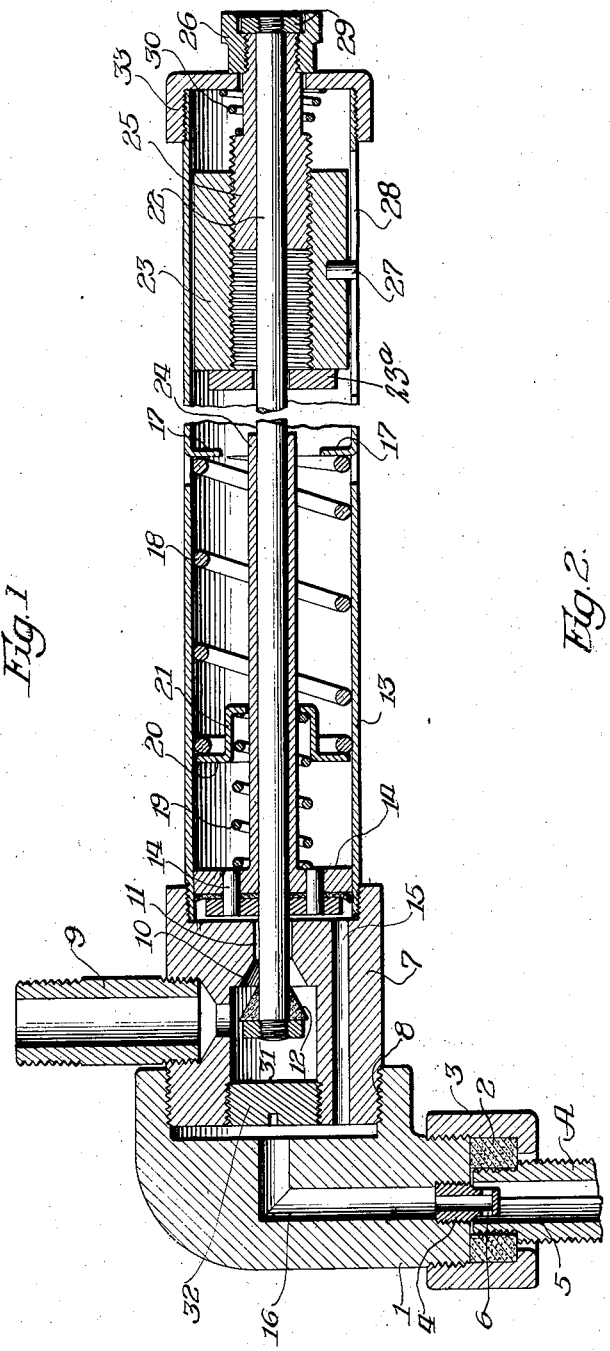
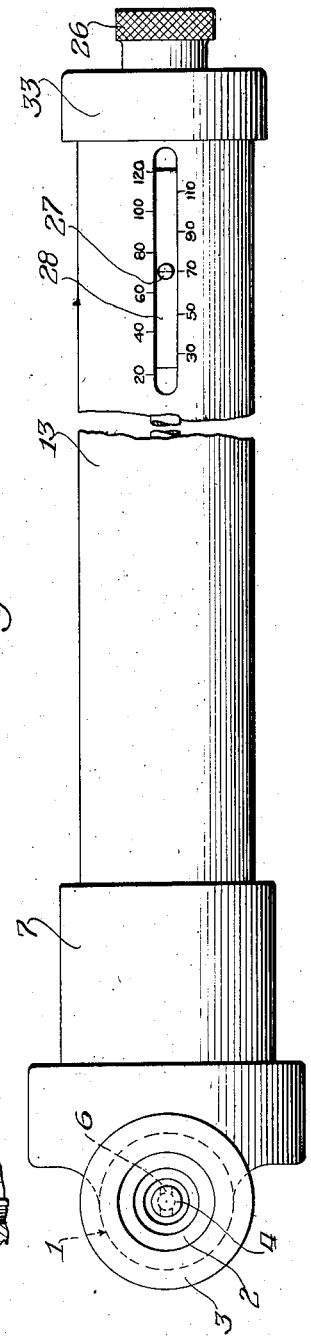
Witness:
Inventor:
Joe Davis Pirtle Patented Aug. 4, 1925.

1,548,206

UNITED STATES PATENT OFFICE.

JOE DAVIS PIRTLE, OF CHICAGO, ILLINOIS.

PRESSURE-LIMITING GAUGE.

Application filed February 23, 1924. Serial No. 694,461.

*To all whom it may concern:*

Be it known that I, JOE DAVIS PIRTLE, a citizen of the United States, residing at Chicago, in the county of Cook and State of Illinois, have invented certain new and useful Improvements in Pressure-Limiting Gauges, of which the following is a specification.

This invention relates to a gauge to be introduced into a conduit through which a fluid medium is supplied under pressure, and which will act to arrest the delivery of the fluid medium as soon as the latter attains a predetermined pressure in the space being charged.

The object of the invention is to provide a gauge of this general class with an improved operative principle, the underlying feature of which consists in having the piston, which controls the valve that cuts off the supply of fluid, arranged not only to move in opposition to a weighing means in response to pressure accumulated by the fluid, as in devices heretofore employed for this purpose, but to execute this movement at first and for a substantial portion of the throw of the piston, independently of the valve which the piston controls, so that the weighing operation may be better accomplished, and the valve will be picked up and moved to its seat by the latter part of the movement of the piston. Another feature consists in having the weighing element, preferably a compression spring, substantially constant in resistance which it opposes to the pressure-actuated piston, and to vary the pressure at which the valve is closed by shifting the means through which the piston picks up the valve. Other features relate to details of construction whereby the several underlying features may be advantageously realized.

In the accompanying drawing—

Figure 1 is a longitudinal section of a pressure-limiting gauge embodying the several features of the present invention, and designed for use in controlling the inflation of pneumatic tires.

Figure 2 is a side view of the device as seen from the underside of Figure 1.

A represents a standard inflating stem of a pneumatic tire, and is typical of any device to which a fluid is to be supplied under pressure.

1 represents an attaching nozzle suitably designed for establishing air-tight connection with a stem, such as A, as, for instance, by providing the nozzle with an annular packing 2 fitting the stem A and a sleeve 3 confining the packing to the nozzle. Such nozzle is also preferably equipped with an unseating stud 4 protruding from its end in position to engage the valve stem 5 usually found within an inflating stem; said stud being preferably provided by threading into the end of the nozzle 1 a short nipple having its end transversely apertured as at 6 to permit escape of fluid being charged, while the stud is resting upon the stem of the valve.

Nozzle 1 is carried by a shell 7, as for instance, by threading it to the shell at 8, and this shell also carries a supply nipple 9 through which fluid under pressure may be delivered to the shell; also a valve seat 10 surrounding an escape passage 11 and adapted to receive a valve 12 for arresting the flow of fluid through said escape passage. Likewise mounted upon the shell 7 is a cylinder 13 in which works a valve-controlling piston 14 that is subject to pressure of fluid beyond the valve 12, and communication is established by a duct 15, between the pressure side of piston 14 and the duct 16 in the nozzle 1, so that pressure accumulating in a space supplied by said nozzle will react through the ducts 16 and 15 upon the piston 14 and tend to move the latter in the cylinder 13. Opposing movement of piston 14 under such pressure is a weighing means, preferably in the form of a spiral spring or springs, located between the piston 14 and a fixed abutment 17, which latter is conveniently provided by deflecting inwardly one or more tongues struck from the metal of the cylinder 13. This weighing means preferably comprises a main spiral spring 18 for weighing heavier pressures developed in the space being charged, and an auxiliary spring 19 for weighing lighter pressures; the auxiliary spring being preferably constructed with a capacity that will be exhausted before the main spring begins to compress, and the load of the former spring being imposed upon the latter spring through the medium of a traveling partition 20 which receives the piston 14 after the auxiliary spring is compressed, and which is formed with a chamber or recess 21 that admits said auxiliary spring 19 when in its compressed state.

The described weighing means is designed primarily to adapt the gauge to serve for either the so-called ballon tires, in which relatively low pressures are maintained, or for hard tires, in which much higher pressures are required.

In order that the piston 14 may pick up the valve 12 and move it in the direction of closing only as the piston approaches the limit of its movement under pressure to be accumulated, said valve carries upon its rod 22 a stop or shoulder 23 which is in the path of but normally spaced away from the outer end of a stem 24 carried by the piston 14, and which is preferably of tubular form and concentric with the rod 22 of the valve. And in order that the stop 23 may be given different positions relatively to the rod 22, and thereby determine the degree of compression in the weighing means 18, 19, which must take place, and therefore the degree of pressure which must have accumulated before the valve is closed, said stop 23 is connected with the rod 22 through means of a threaded core or bushing 25 adapted to be rotated by the knurled head 26; the stop 23 being held against rotation by a stud 27 working in a slot 28 of the cylinder 13, and being caused to move in the direction of the axis of the valve and piston by the rotation of said knurled head. For convenience in producing the threaded piece 23, constituting the stop on the piston rod 22, the bore in said piece which receives the adjusting bushing 25 extends entirely through the piece and is closed at the inner end by a washer 23ª that provides the necessary abutment for the tubular stem 24 of the piston 14. Stud 27 and the walls of the slot 28 with which it cooperates, bearing suitable graduations, afford convenient means for calibrating the position of the stop 23, and, therefore, the pressure that will be permitted to accumulate before the valve 12 shuts off the flow. Bushing 25, being free to rotate upon the valve rod 22, is made to transmit movement of the stop 23 by engaging beneath the head 29 upon the valve rod. Bushing 25, and stop 23 which it carries, will be normally returned from valve-closing movement and held inwardly by means of a spring 30. Some means of yieldingly holding the check valve from its seat until the weighing movement is about completed is desirable in order to leave a free space for the flow of air and to avoid premature closing of the valve under the pressure that is being measured. The frictional fit between the bushing 25 and the valve rod 22 may be sufficient to hold the valve open, notwithstanding friction of the piston stem upon the rod, while the load is accumulating, or the user's thumb or hand may be so held over the valve rod head 29 as to prevent premature seating of the valve under frictional influence of the piston stem 24, in which case, the forcible movement of the heads 26 and 29, as the limit of pressure is approached, will apprize the user of the completion of the charging operation.

In constructing a device embodying the operative principles above described, the nozzle 1 and the cylinder 13 are preferably formed separately from the shell 7; the chamber 31 in which the valve 12 operates will be closed by a removable plug 32 to permit removal of the valve from its rod; and the outer end of the cylinder will be closed by the end cap 33. But these and other details of the embodiment selected for purposes of illustration may obviously be changed without departing from the spirit of the invention.

From the foregoing description it will be seen that the main spring 18 and auxiliary spring 19 are arranged to act in tandem against the piston 14, the thrust of the piston being imparted through one spring to the other, and, preferably, the initial resistance of the main spring 18 will be such as to develop no weighing movement until the auxiliary spring 19 has been compressed to substantially its full weighing capacity, at which time the piston 14 will encounter the partition member 20 and deliver its further weighing thrust directly against the main spring. In an arrangement in which the weighing movement is developed before the valve is acted upon, and the accumulated load at which the valve is moved to control flow of pressure medium is predetermined by varying the point in the movement of the piston, at which the piston picks up the valve, the weighing function of the compressible spring is much better than in devices where the piston is connected to the valve without lost motion, and closing movement of the valve immediately follows and results from the initial movement of the piston, and where, as a consequence, the weighing spring must be lengthened or shortened and its initial compression changed in order to predetermine the pressure of fluid accumulation at which the gauge will act.

I claim:

1. In a pressure limiting fluid supply gauge, a valve movable to control the flow of fluid, a pressure weighing means, and a valve actuating piston oppositely acted upon by the pressure to be gauged and by said weighing means; said piston moving independently of its controlled valve in weighing the pressure to be accumulated, and picking up the valve to initiate closing movement as the end of the weighing movement is approached.

2. In a pressure limiting fluid supply gauge, a valve movable to control the flow of fluid, a pressure weighing means, and a valve controlling piston oppositely acted upon by the pressure to be gauged and by said weighing means; said piston executing the fore part of its movement independently of the valve and actuating the valve only by the latter part of its movement.

3. In a pressure limiting fluid supply gauge, a valve movable to control the flow of fluid, a pressure weighing means, a piston oppositely acted upon by the pressure to be gauged and by said weighing means, and a stop through which the valve is moved, receiving movement from the piston only after the latter has performed a weighing movement.

4. In a pressure limiting fluid supply gauge, a valve movable to control the flow of fluid, a pressure weighing means, a piston oppositely acted upon by the pressure to be gauged and by said weighing means, and a stop through which the valve is moved, receiving movement from the piston after the latter has performed a weighing movement; said stop being adjustable relatively to the valve to vary the extent of weighing movement of the piston that occurs before movement is transmitted to the valve.

5. In a pressure limiting gauge, a valve adapted to control the flow of fluid, a piston for actuating said valve, subjected to pressure of the medium to be controlled, and a weighing means acting upon said piston in opposition to said pressure; said weighing means comprising main and auxiliary springs developing separate weighing effects.

6. In a pressure limiting gauge, a valve for controlling the flow of pressure medium, a piston adapted to impart movement to said valve, and a weighing means comprising a plurality of springs of different capacity acting in tandem against said piston in opposition to the pressure medium.

7. In a pressure limiting gauge, a valve for controlling the flow of pressure medium, a piston adapted to impart movement to said valve, and a weighing means comprising a plurality of springs of different capacity acting in tandem against said piston in opposition to the pressure medium; one of said springs having an initial resistance approximately equal to the full weighing capacity of another of said springs.

8. In a pressure limiting gauge, a valve for controlling flow of pressure medium, a piston subjected in one direction to the action of said pressure medium, and a weighing means opposing movement of the piston by said pressure medium; said weighing means comprising a main spring and an auxiliary spring acting on said piston, the one through the other, and a partition inserted between said springs through which thrust is imparted from one spring to the other.

9. In a pressure limiting gauge, a valve for controlling flow of pressure medium, a piston subjected in one direction to the action of said pressure medium, and a weighing means opposing movement of the piston by said pressure medium; said weighing means comprising a main spring and an auxiliary spring acting on said piston, the one through the other, and a partition inserted between said springs through which thrust is imparted from one spring to the other; said partition being provided with a recess adapted to receive the auxiliary spring when compressed.

10. In a pressure limiting gauge, a valve for controlling flow of pressure medium, a piston subjected in one direction to the action of said pressure medium, and a weighing means opposing movement of the piston by said pressure medium; said weighing means comprising a main spring and an auxiliary spring acting on said piston, the one through the other, and a partition inserted between said springs through which thrust is imparted from one spring to the other; the auxiliary spring being interposed between the main spring and the piston.

11. In a pressure limiting gauge, a valve for controlling flow of pressure medium, a piston subjected in one direction to the action of said pressure medium, and a weighing means opposing movement of the piston by said pressure medium; said weighing means comprising a main spring and an auxiliary spring acting on said piston, the one through the other, and a partition inserted between said springs through which thrust is imparted from one spring to the other; the auxiliary spring being interposed between the main spring and the piston; and the partition being adapted to receive abutment of the piston and transmit thrust to the main spring after the auxiliary spring is compressed.

12. In a pressure limiting gauge, a valve adapted to control the flow of pressure medium, a rod through which said valve is controlled, a stop through which the valve rod is moved, a piston acted upon in one direction by the pressure medium, a weighing means yieldingly resisting movement of the piston by the pressure medium, and a piston stem adapted to engage said stop and impart movement to the valve after weighing movement of the piston.

13. In a pressure limiting gauge, a valve adapted to control the flow of pressure medium, a rod through which said valve is controlled, a stop through which the valve rod is moved, a piston acted upon in one direction by the pressure medium, a weighing means yieldingly resisting movement of the piston by the pressure medium, and a piston stem adapted to engage said stop and impart movement to the valve after weighing movement of the piston; said stop being adjustable upon the valve rod to determine the degree of weighing movement in the piston before movement is imparted to the valve.

14. In a pressure limiting gauge, a valve for controlling the flow of pressure medium, having a rod by which it is moved, a stop surrounding the valve rod, a sleeve interposed between the stop and the valve rod and threaded to the one thereof and revolving relatively to the other, whereby it imparts adjustment to the stop relatively to the rod, a weighing means, and a piston acted upon in one direction by the pressure medium and in the other direction by the weighing means; said piston being adapted to impart movement to said stop.

15. In a pressure limiting gauge, a housing, a valve for controlling the flow of pressure medium, a piston acted upon by the pressure medium having a weighing means resiliently opposing its movement, and a valve rod adapted to receive movement from the piston after the latter has performed a weighing movement; said valve rod extending beyond said housing and serving to disclose movement of the valve.

16. In a pressure limiting gauge, a housing, a valve adapted to control the flow of pressure medium, having a rod extending through said housing, a piston adapted to be acted upon in one direction by pressure medium and having a resilient weighing means acting upon it in the opposite direction, a stem extending from said piston in the direction of said valve rod, a stop on said valve rod in the path of the piston stem, an adjusting sleeve adjustably supporting said stop upon said valve rod, and a turning head in said sleeve beyond the confines of the housing.

17. In a pressure limiting gauge, a housing, a valve adapted to control the flow of pressure medium, having a rod extending through said housing, a piston adapted to be acted upon in one direction by pressure medium and having a resilient weighing means acting upon it in the opposite direction, a stem extending from said piston in the direction of said valve rod, a stop on said valve rod in the path of the piston stem, an adjusting sleeve adjustably supporting said stop upon said valve rod, and a turning head in said sleeve beyond the confines of the housing; said valve rod extending through and having a head overlapping the sleeve head.

18. In a pressure limiting gauge, a housing, a valve for controlling the flow of pressure medium, having a rod extending longitudinally of the housing, a piston adapted to be acted upon in one direction by the pressure medium and having a resilient weighing means acting upon it in opposition to said pressure medium, a stem extending from said piston in the direction of the valve rod, a stop mounted on said valve rod in the path of said stem, and a spring acting upon said stop to return it to normal position when released by the piston stem; said stop and piston stem being related to permit the piston to execute weighing movement before encountering the stop.

Signed at Chicago, Illinois, this 20th day of February, 1924.

JOE DAVIS PIRTLE.